(12) United States Patent
Silveri et al.

(10) Patent No.: US 8,738,258 B2
(45) Date of Patent: May 27, 2014

(54) SHIFT HUNTING CONTROL OF A HYBRID ELECTRIC VEHICLE

(75) Inventors: Andrew J. Silveri, Royal Oak, MI (US); Ihab S. Soliman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1675 days.

(21) Appl. No.: 12/048,608

(22) Filed: Mar. 14, 2008

(65) Prior Publication Data

US 2009/0234549 A1 Sep. 17, 2009

(51) Int. Cl.
*G06F 7/70* (2006.01)
*G06F 19/00* (2011.01)
*G06G 7/00* (2006.01)
*G06G 7/76* (2006.01)
*G06F 7/00* (2006.01)
*G06F 17/00* (2006.01)

(52) U.S. Cl.
USPC .............................................. 701/70; 701/62

(58) Field of Classification Search
USPC ..................................................... 701/70, 62
See application file for complete search history.

(56) References Cited

U.S. PATENT DOCUMENTS

2007/0142166 A1\* 6/2007 Gebby ............................ 477/15
2007/0216312 A1\* 9/2007 Ogata et al. .................... 315/131

\* cited by examiner

*Primary Examiner* — Imran Mustafa
(74) *Attorney, Agent, or Firm* — David B. Kelley; MacMillan, Sobanski & Todd, LLC

(57) ABSTRACT

In a powertrain for a motor vehicle that includes an engine, a transmission driveably connected to the engine and wheels of the vehicle, an electric machine for transmitting power to at least some of the vehicle wheels, a method for controlling the powertrain includes operating the engine and transmission to produce a wheel torque at a desired vehicle speed with the transmission operating in a desired gear in response to a demanded wheel torque, increasing the demanded wheel torque due to the vehicle ascending a grade, determining a magnitude of wheel torque able to be produced in the desired gear, using the electric motor to provide a second wheel torque in combination with wheel torque whose magnitude is equal to or greater than the wheel torque being produced in the desired gear, and continuing to operate the transmission in the desired gear.

12 Claims, 5 Drawing Sheets

SHIFT HUNTING CONTROL OF A HYBRID ELECTRIC VEHICLE

BACKGROUND OF THE INVENTION

1. Field of the Invention

This invention relates generally to a powertrain for a hybrid electric vehicle (HEV), and, in particular to a method for avoiding shift hunting among gears of an automatic transmission.

2. Description of the Prior Art

A motor vehicle powertrain having an internal combustion engine and an automatic transmission, in which discrete gear ratios are produced, typically has a shift schedule calibrated to schedule downshifts when the engine runs out of reserve power and to schedule upshifts as close as possible to tractive effort crossovers. The shift schedule is calibrated for use in a vehicle that is unloaded and on level ground since the vehicle generally operates in these conditions.

When the vehicle is on a significant positive slope, the level ground calibration can cause a condition described generally referred to a shift hunting, wherein the transmission frequently upshifts and downshifts between gears when the driver is trying to maintain vehicle speed on a grade having positive slope. The transmission hunts between upshifts and downshifts because the driver is unable to find an accelerator pedal range that will maintain a desired level of vehicle speed. This condition can occur on a grade having positive slope where the driver is trying to maintain a constant speed.

Shift hunting occurs when the vehicle begins to decelerate on the grade due to the increased road load, causing the driver to tip-in to the accelerator pedal to maintain vehicle speed. As a result of the tip-in, the transmission downshifts. Because the vehicle begins to accelerate beyond the desired speed after the downshift is completed, the driver tips-out of the throttle causing an upshift to occur.

This cyclic shift hunting continues until the slope levels or the vehicle leaves the grade. Shift hunting is undesirable due to the excessive upshifting and downshifting, which cause inability to maintain a desired constant speed on the grade.

If a downshift is executed and a subsequent upshift is prevented, shift hunting can be prevented but the driver is dissatisfied because the transmission is perceived to be unresponsive. Inhibiting the upshift causes a reduction in fuel economy due to remaining in the lower gear.

SUMMARY OF THE INVENTION

In a powertrain for a motor vehicle that includes an engine, a transmission driveably connected to the engine and wheels of the vehicle, an electric machine for transmitting power to at least some of the vehicle wheels, a method for controlling the powertrain includes operating the engine and transmission to produce a wheel torque at a desired vehicle speed with the transmission operating in a desired gear in response to a demanded wheel torque, increasing the wheel torque due to the vehicle ascending a grade, determining a magnitude of wheel torque able to be produced in the desired gear, using the electric motor to provide a second wheel torque in combination with wheel torque provided by the engine in the desired gear, and continuing to operate the transmission in the desired gear.

When conditions for shift hunting are detected, torque produced by an electric machine torque increases the current wheel torque so that the resulting wheel torque remains above the road load. The wheel torque provided by the electric machine maintains the desired vehicle speed and allows the transmission to stay in the higher gear until road load decreases.

Cyclic shift hunting between a lower gear and higher gear is prevented. The vehicle operator perceives that the powertrain is automatically responsive to the increased road load caused by the vehicle's ascending a grade that requires more wheel torque.

Continued operation in the higher gear improves fuel economy compared to operation in a lower gear, yet the desired vehicle speed is maintained on the grade.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
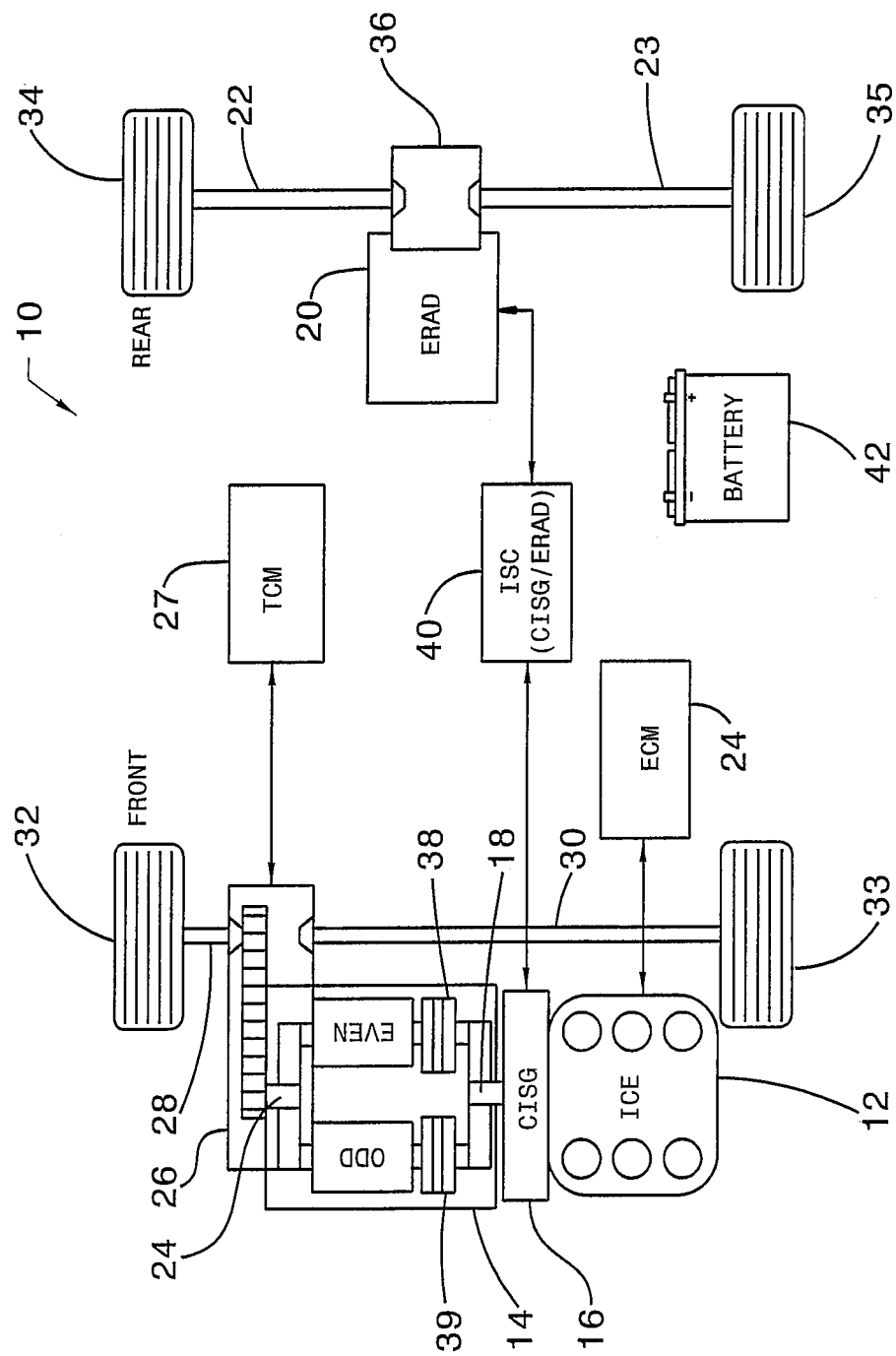
FIG. 1 is a schematic diagram showing an automotive vehicle powertrain for a hybrid electric vehicle.
Figures 2, 3:
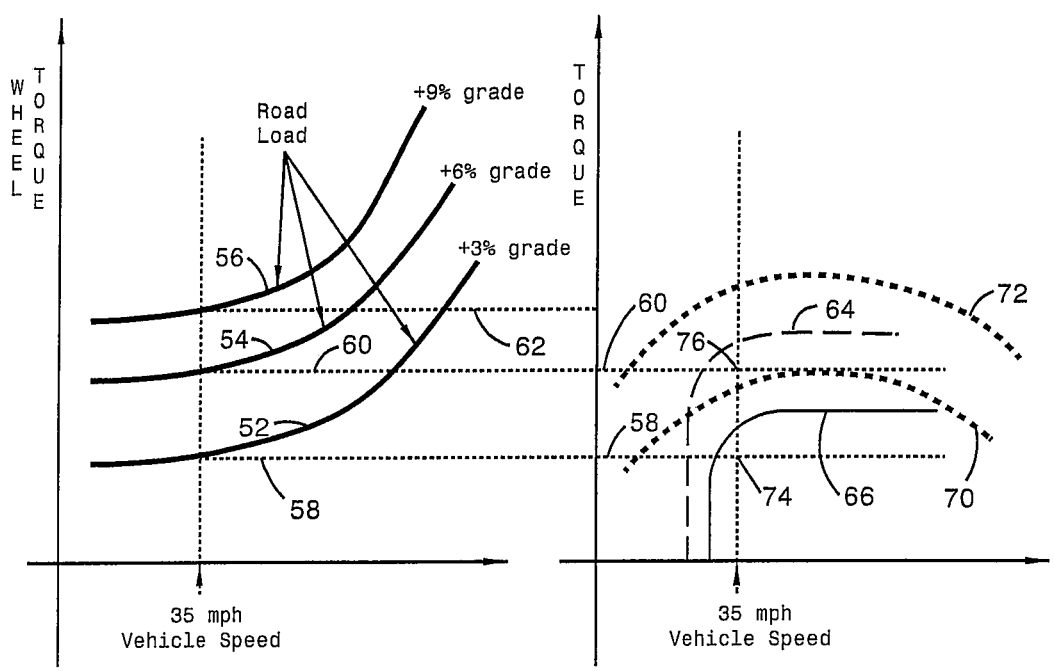
FIG. 2 is a graph relating road load torque at the wheels and vehicle speed for a range of positive grades.
FIG. 3 is graph showing a gear shift schedule between third and fourth gears with available engine torque in those gears superimposed on the schedule.

Referring first to FIGS. 1 and 2, the powertrain 10 configuration includes a first power source such as an internal combustion engine 12, a diesel engine or a gasoline engine; an automatic transmission 14 producing multiple forward and reverse gear ratios; an electric machine 16 driveably connected to the engine crankshaft and transmission input 18, such as a crankshaft-integrated starter/generator (CISG) for providing starter/generator capability; and an additional electric machine 20 driveably connected to a rear axle differential mechanism 36, such as an electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, 35 through ERAD gearing 36, a differential mechanism 36, rear axles 22, 23 and wheels 34, 35.

The powertrain 10 comprises a first power path driveably connected to the load that includes CISG 16, transmission 14, final drive unit 26, axles 28, 30 and the wheels 32, 33. A gear of the transmission must be engaged between input 18 and output 24 and the input clutch 38 or 39 that is associated with the engaged gear must be engaged to complete a drive path between CISG 16 and the vehicle wheels 32, 33. Powertrain 10 also comprises a second power path driveably connected to the load that includes ERAD 20, ERAD gearing 48, a differential mechanism 36, rear axles 22, 23 and wheels 34, 35.

An electronic engine control module (ECM) 24 controls operation of engine 12. An electronic transmission control module (TCM) 26 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

The graphs of FIGS. 2 and 3 show that a road load caused by the vehicle operating on a grade having positive slope can affect a transmission shift schedule, which is defined to establish, for the current vehicle operating state, the desired gear produced by transmission 14. The current operating state is a function of current vehicle speed and current driver demanded torque, which is usually represented by the degree to which an accelerator pedal is depressed. For purposes of this description, road load is the minimum torque that must be transmitted to the driven wheels 32-35 to maintain vehicle speed in order that the vehicle can ascend a grade having positive slope.

In a vehicle powertrain having an automatic transmission that produces discrete gear ratios, the shift schedule is optimized for unloaded, level ground vehicle operation. When the vehicle is climbing a steep grade, road load can increase significantly compared to road load on level ground. FIG. 2 illustrates the variation of required wheel torque with vehicle speed for three grades of positive slope 52, 54 and 56. Line 58 represents the required wheel torque on a three percent grade at 35 mph; line 60 represents the required wheel torque on a six percent grade at 35 mph; line 62 represents the required wheel torque on a nine percent grade at 35 mph.

FIG. 3 illustrates a boundary line 64, at which a downshift to third gear from fourth gear occurs when the current operating state moves from above line 64 to below that line. Similarly, line 66 represents the boundary at which an upshift to fourth gear from third gear occurs when the current operating state moves from below line 66 to above line 66.

Line 70 represents the maximum available engine torque transmitted to the wheels over a range of vehicle speed when transmission 14 operates in fourth gear. Line 72 represents the maximum available engine torque transmitted to the wheels over a range of vehicle speed when the transmission operates in third gear.

As FIG. 3 shows, with the vehicle operating on a three percent positive grade at 35 mph (line 58), the driver demanded torque for the current operating state 74 is less than the torque available 70 in fourth gear. Therefore, the current driver demanded torque can be delivered to the wheels and the desired constant vehicle speed can be maintained in fourth gear.

With the vehicle operating on a six percent positive grade at 35 mph (line 60), the driver demanded torque for the current operating state 76 is greater than the torque available 70 in fourth gear, and operating state 76 is above line 64 and in a range where the desired gear is third gear. Consequently, the vehicle will decelerate on the six percent grade.

To maintain the desired speed of 35 mph, the driver will likely demand greater torque by executing a tip-in, i.e., depressing the accelerator pedal, which causes a downshift to third gear. The downshift will then accelerate the vehicle above the desired 35 mph speed and the driver will tip-out of the accelerator pedal to slow the vehicle. The tip-out and the resulting vehicle deceleration will cause the transmission 14 to upshift to fourth gear.

Figure 4:
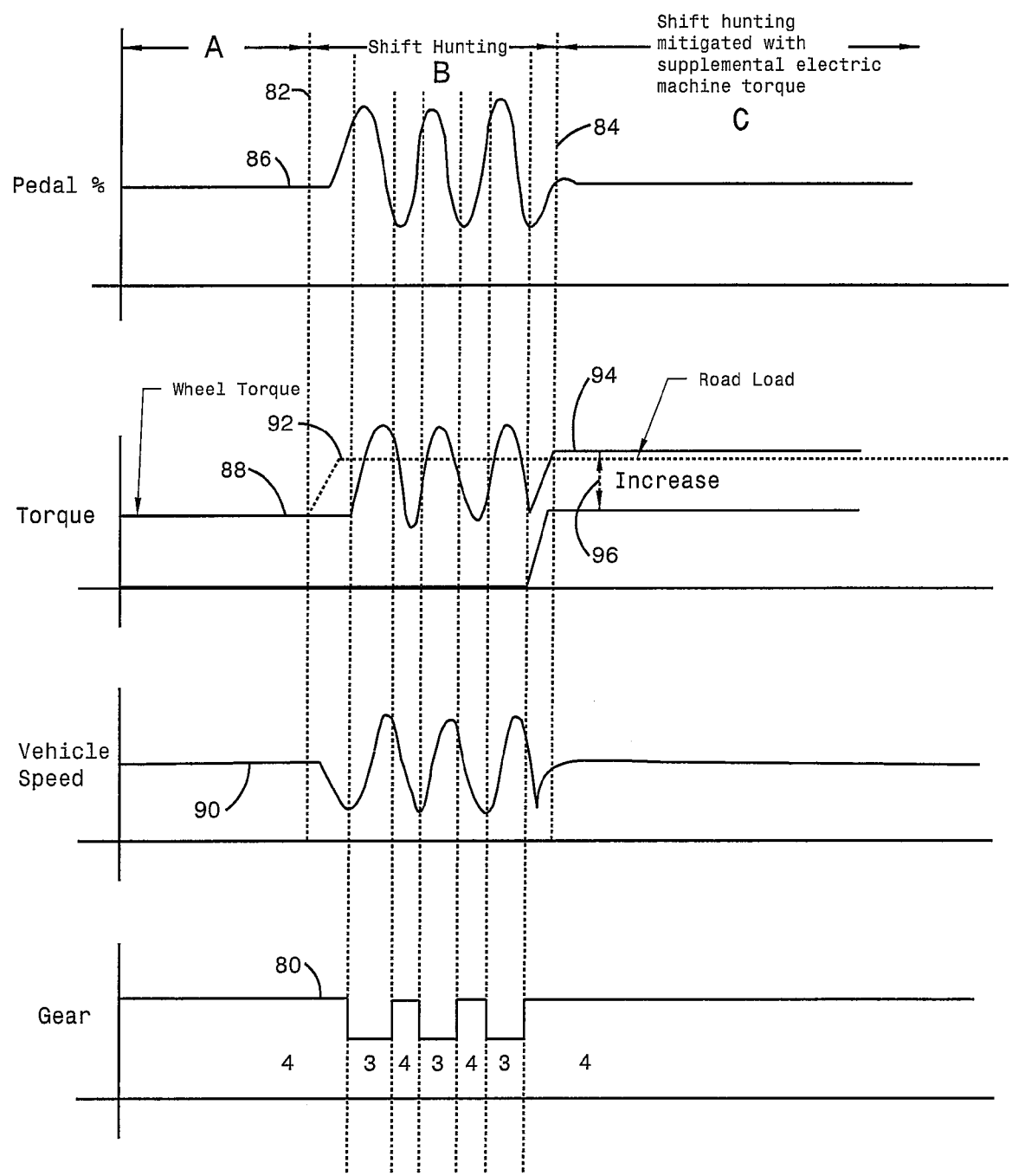
FIG. 4 is a graph showing the variation of accelerator pedal position, demanded torque, road load, vehicle speed and gears during a shift hunting condition.

As illustrated in FIG. 4, this undesired cycle of upshifts and downshifts 80, called shift hunting, occurs in zone B, which begins at 82 when the vehicle enters a grade with positive slope and continues until either shift hunting control is activated at 84 or the vehicle exits or crests the grade. Zone A represents vehicle operation on level ground. Zones B and C represent vehicle operation on a six percent grade having positive slope. Cyclic variation of the accelerator pedal displacement 86, wheel torque 88, vehicle speed 90, and gear 80 are shown in FIG. 4 with a phase lag between each successive variable. These cyclic variations occur after road load 92 increases due to the vehicle entering the grade. When shift hunting control is activated at 84, wheel torque 88 increases to 94 due to an increase in wheel torque 96 being produced by at least one of the electric machines 16, 20.

In zone C, torque produced by at least one of the electric machines 16, is used to increase wheel torque currently being transmitted to the wheels. In this way, the increased magnitude of wheel torque meets or exceeds the road load, vehicle speed is constant in the current gear, and no down shift is required. Engine torque is transmitted through transmission 14, final drive unit and differential mechanism 26 to the front axles 28, 30 and front wheels 32, 33. Powertrain 10 also includes a second power path driveably connected to the load that includes ERAD 20, gearing 48, differential mechanism 36, axles 22, 23 and wheels 34, 35.

Figure 5:
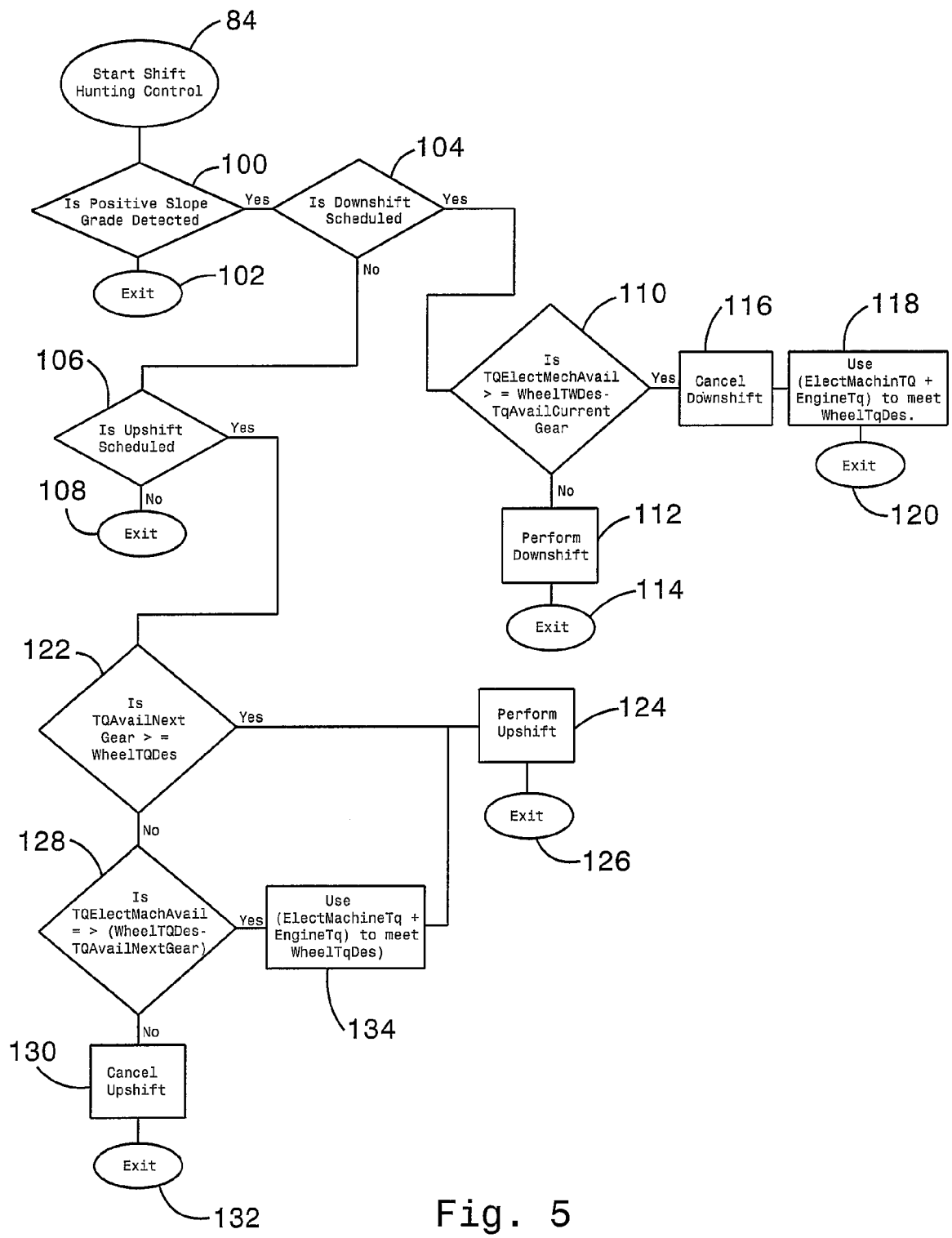
FIG. 5 is a logic flow diagram of a algorithm for controlling shift hunting.

FIG. 5 shows the steps of an algorithm for controlling shift hunting. At step 100 a test is made to determine whether the vehicle is on a positive slope grade. If the result of test 100 is logically false, at step 102 execution of the algorithm is terminated and control returns to step 84. The algorithm is executed repetitively at about 8 ms intervals.

If the result of test 100 is logically true, at step 104 a test is made to determine whether a downshift is scheduled to occur upon reference to the current operating state and the shift schedule. If the result of test 104 is false, control advances to step 106 to determine whether an upshift is scheduled to occur. If the result of test 106 is false, at step 108 execution of the algorithm is terminated and control returns to step 84.

The preferred result of the shift hunting control algorithm is to remain in the current gear as long as possible while transcending the grade. The least preferable shift to occur on the grade is a downshift since it can accelerate the vehicle beyond the current driver demand and initiate shift hunting.

If at step 104 a downshift is scheduled on the positive slope grade, at step 110 a check is made to determine whether an electric machine 16, 20 can provide sufficient additional wheel torque to avoid a downshift. At step 110, the available electric machine torque is compared to the difference between the desired wheel torque and the engine torque available in the current gear.

If the result of test 110 is false, control advances to step 112, where transmission 14 performs a downshift, whereupon, at step 114, execution of the algorithm is terminated and control returns to step 84.

If the result of test 110 is true, at step 116 the scheduled downshift is cancelled, and at step 118 torque produced by at least one of the electric machines 16, 20 is used in addition to the current wheel torque to maintain a constant vehicle speed without requiring a downshift to occur. Then, at step 120 execution of the algorithm is terminated and control returns to step 84.

If the result of test 106 is true, a check is performed at step 122 to determine if the available wheel torque in the scheduled gear is greater than the desired wheel torque.

If the result of test 122 is true, at step 124 transmission 14 performs the upshift since the desired wheel torque can be produced in the next higher gear, which prevents the vehicle from decelerating in the higher gear due to the grade. Then, at step 126 execution of the algorithm is terminated and control returns to step 84.

If the result of test 122 is false, indicating that the desired wheel torque is not available in the next higher gear, a test is made at step 128 to determine whether the available wheel torque from an electric machine exceeds the difference between the desired wheel torque and the available torque in the next higher gear.

If the result of test 128 is false, indicating that electric machine torque does not meet the difference between the desired wheel torque and the available torque in the next higher gear, at step 130 the upshift is cancelled. Then, at step 132 execution of the algorithm is terminated and control returns to step 84.

If the result of test 128 is true, at step 134 the electric machine torque is used in addition to the current wheel torque to meet the desired wheel torque. At step 124, transmission 14 performs the upshift and stays in the higher gear while meeting the driver demand.

Figure 6:
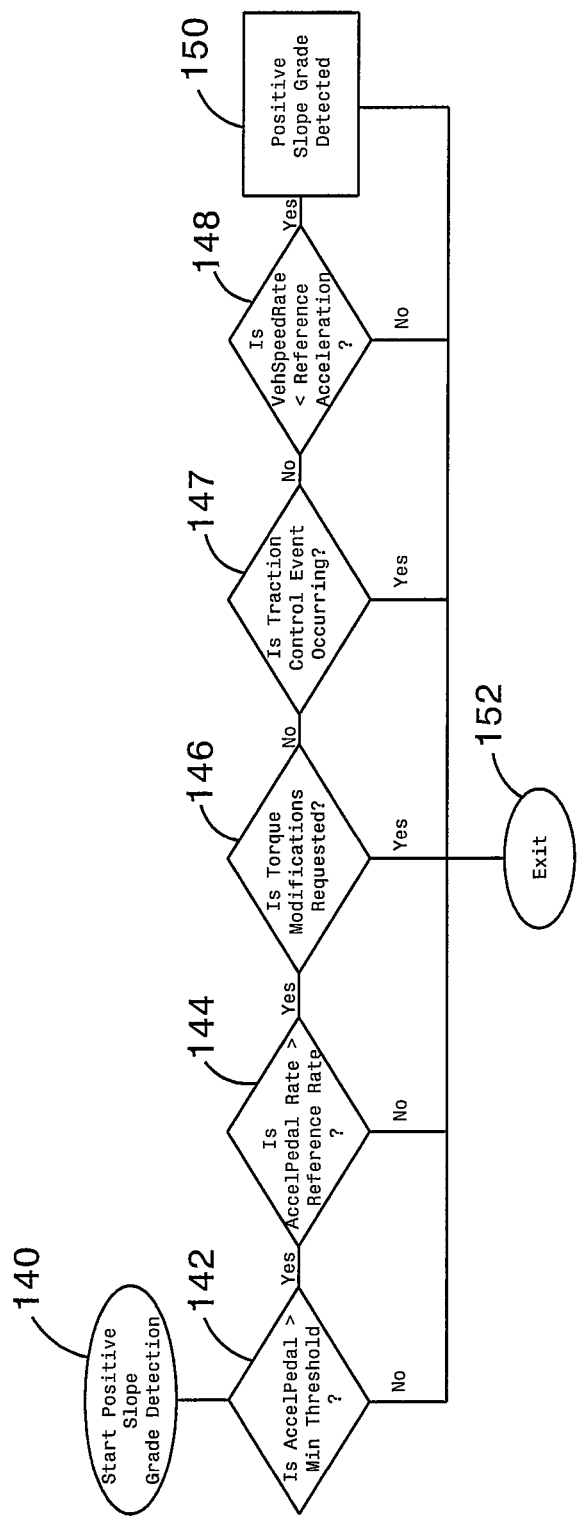
FIG. 6 is a logic flow diagram of an algorithm for determining whether a vehicle is operating on a grade having positive slope.

FIG. 6 illustrates the steps of a grade detection algorithm for detecting whether the vehicle is operating on a grade of positive slope. The algorithm is initialized at step 140. At step 142, a test is made to determine whether the vehicle's accelerator pedal position, i.e., the distance the pedal is displaced from its neutral position, is greater than a reference displacement. When the accelerator pedal is displaced more than the reference displacement, the driver is demanding a sufficient wheel torque magnitude.

If the result of test 142 is true, at step 144 a test is made to determine whether the rate of change of accelerator pedal position is greater than a reference rate, which is a calibrated reference. A true result of test 144 indicates that the driver desires to maintain vehicle speed or to accelerate the vehicle.

Modern vehicle control systems with an electronic throttle can send a command to limit or reduce wheel torque by retarding spark timing relative to a maximum brake torque spark or by reducing torque through electronic throttle control by a reduction in air flow. If the result of test 144 is true, at step 146 a test is made to determine whether a command, such as that produced by an electronic vehicle control system, has been made to reduce wheel torque.

If the result of test 146 is false, which indicates that the driver demanded wheel torque is not overridden by a torque reduction command issued by a vehicle control system or by another request or command, a test is made at step 147 to determine whether a traction control event is occurring.

If the result of test 147 is false, a test is made at step 148 to determine whether the vehicle is decelerating at less than a reference deceleration, which is a calibrated reference.

Vehicle deceleration can be determined from the time rate of change of vehicle speed as represented by: (1) the rotational speed of the ERAD electric motor 20 upon accounting for the speed ratio of a power path between the rear wheels 34, 35 and motor 20, or (2) the rotational speed of the crankshaft-integrated starter/generator CISG 16 upon accounting for the speed ratio of a power path between the front wheels 32, 34 and CISG 16, or (3) a speed sensor whose output speed signal represents the speed of transmission output shaft 24, or (4) the speed sensor of a wheel brake system. Preferably vehicle speed is determined with reference to a signal representing the speed of one of the electric machines, CISG 16 or ERAD 20 because that signal has a higher resolution than the alternative speed sensors.

If the result of each of tests 142, 144 and 148 is true, and the result of each of tests 146 and 147 is false, the control strategy concludes that the driver is attempting to maintain vehicle speed or to accelerate the vehicle, no internal functions are overriding the driver wheel torque demand, yet the vehicle is decelerating. Then, at step 150, road load is assumed to have increased due to a grade of positive slope hence a positive slope grade has been detected.

If the result of any of tests 142, 144 and 148 is false or the result of any of tests 146 and 147 is true, at step 152 execution of the grade detection algorithm is terminated.

The transmission 14 to which the control strategy can be applied is an automatic transmission that produces multiple speed ratios, i.e., the speed of its input to the speed of its output. The transmission 14 may shift among discrete gears, such as a conventional multiple-speed transmission having a torque converter, or a powershift transmission having multiple input clutches for driveably connecting the engine to the transmission input. In either case, the transmission produces a speed ratio that varies inversely with the number of the gear, i.e., a lower speed ratio in a higher gear, a higher speed ratio in a lower gear. Alternatively, transmission 14 may produce an infinite range of speed ratios, such as a belt-drive continually variable transmission or a traction-drive continually variable transmission.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle powertrain, comprising:
    (a) scheduling a downshift from a current gear while an engine produces wheel torque with a demanded wheel torque;
    (b) determining, using a controller, whether the downshift can be avoided using an electric motor to produce wheel torque combined with the engine-produced wheel torque;
    (c) continuing operation in the current gear if the downshift can be so avoided;
    (d) producing the downshift if the downshift cannot be so avoided.

2. The method of claim 1 wherein step (a) further comprises the step of determining that the vehicle is ascending a grade.

3. The method of claim 1 wherein step (a) further comprises the steps of:
    preparing a gear shift schedule that establishes a boundary between a range of operating states for each desired gear as a function of the demanded wheel torque and vehicle speed; and
    using the demanded wheel torque, the vehicle speed and the shift schedule to determine a desired gear.

4. The method of claim 1 wherein step (b) further comprises the steps of:
    determining a current magnitude of wheel torque able to be produced by the electric motor; and
    using the electric motor to provide the second wheel torque, if the current magnitude of wheel torque able to be produced by the electric motor is equal to or greater than a difference between the demanded wheel torque and the first wheel torque able to be produced in the current gear using the engine and the transmission without using the electric motor.

5. The method of claim 1 wherein step (b) further comprises the steps of:
    determining a current magnitude of wheel torque able to be produced by the electric motor; and making no use of the electric motor to provide the second wheel torque, if the current magnitude of wheel torque able to be produced by the electric motor is less than a difference between the demanded wheel torque and the first wheel torque able to be produced in the current gear using the engine and a transmission without using the electric motor; and performing the downshift.

6. In a powertrain for a motor vehicle that includes an engine, a transmission driveably connected to the engine and wheels of the vehicle, an electric machine able to operate as an electric motor for transmitting power to at least some of the vehicle wheels, a method for controlling the powertrain comprising the steps of:

(a) operating the engine and transmission to produce a wheel torque at a desired vehicle speed with the transmission operating in a current gear in response to a demanded wheel torque;

(b) determining, using a controller, that the vehicle is ascending a grade and requires an increased wheel torque to maintain the vehicle speed;

(c) using a shift schedule to determine that a downshift is to occur due to the increased demanded wheel torque;

(d) determining a magnitude of engine-produced wheel torque able to be produced in the current gear;

(e) continuing operation in the current gear using the electric motor to provide a second wheel torque in combination with the magnitude of engine-produced wheel torque able to be produced in the current gear.

7. The method of claim 6 wherein step (a) further comprises the steps of:

preparing a gear shift schedule that establishes a boundary between a range of operating states for each desired gear as a function of the demanded wheel torque and vehicle speed; and using the demanded wheel torque, the vehicle speed and the shift schedule to determine the desired gear.

8. The method of claim 6 wherein step (e) further comprises the steps of:

determining a current magnitude of wheel torque able to be produced by the electric motor; and using the electric motor to provide the second wheel torque, if the current magnitude of wheel torque able to be produced by the electric motor is equal to or greater than a difference between the increased demanded wheel torque and the magnitude of wheel torque able to be produced in the desired gear.

9. The method of claim 6 wherein step (e) further comprises the steps of:

determining a current magnitude of wheel torque able to be produced by the electric motor; and making no use of the electric motor to provide the second wheel torque, if the current magnitude of wheel torque able to be produced by the electric motor is less than a difference between the increased demanded wheel torque and the magnitude of engine-produced wheel torque able to be produced in the desired gear; and performing a downshift from the current gear.

10. In a powertrain for a motor vehicle that includes an engine, a transmission driveably connected to the engine and wheels of the vehicle, an electric machine able to operate as an electric motor for transmitting power to at least some of the vehicle wheels, a method for controlling the powertrain comprising the steps of:

(a) operating the engine and transmission to produce a wheel torque at a desired vehicle speed with the transmission operating in a desired gear in response to a demanded wheel torque;

(b) determining, using a controller, that the vehicle is ascending a grade and requires a change in wheel torque to maintain the vehicle speed;

(c) using a shift schedule to determine that an upshift to a higher gear is to occur; and (d) performing the upshift, if the magnitude of wheel torque able to be produced in the higher gear is equal to or greater than the increased demanded wheel torque.

11. The method of claim 10 further comprising:

determining that the magnitude of wheel torque able to be produced in the higher gear is less than the increased demanded wheel torque;

determining that the magnitude of wheel torque able to be produced by the electric motor is less than a difference between the increased demanded wheel torque and the magnitude of wheel torque able to be produced in the higher gear; and not performing the upshift.

12. The method of claim 10 further comprising:

determining that the magnitude of wheel torque able to be produced in the higher gear is less than the increased demanded wheel torque;

determining that the magnitude of wheel torque able to be produced by the electric motor is equal to or greater than a difference between the increased demanded wheel torque and the magnitude of wheel torque able to be produced in the higher gear;

using the electric motor to provide a second wheel torque in combination with the magnitude of wheel torque able to be produced in the higher gear; and performing the upshift.

* * * * *